United States Patent
Pang

(10) Patent No.: US 9,862,139 B2
(45) Date of Patent: Jan. 9, 2018

(54) THREE DIMENSIONAL PRINTING APPARATUS

(71) Applicants: XYZprinting, Inc., New Taipei (TW); Kinpo Electronics, Inc., New Taipei (TW)

(72) Inventor: Bo Pang, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 196 days.

(21) Appl. No.: 15/071,176

(22) Filed: Mar. 15, 2016

(65) Prior Publication Data

US 2017/0266888 A1    Sep. 21, 2017

(51) Int. Cl.
| | |
|---|---|
| *B29C 67/00* | (2017.01) |
| *B29C 64/20* | (2017.01) |
| *B29C 64/124* | (2017.01) |
| *B33Y 30/00* | (2015.01) |

(52) U.S. Cl.
CPC ............ *B29C 64/20* (2017.08); *B29C 64/124* (2017.08); *B29C 67/0092* (2013.01); *B33Y 30/00* (2014.12)

(58) Field of Classification Search
CPC ... B29C 64/171; B29C 64/176; B29C 64/124; B29C 64/20; B33Y 30/00
See application file for complete search history.

(56) References Cited

U.S. PATENT DOCUMENTS

| | | | | |
|---|---|---|---|---|
| 7,255,551 | B2 * | 8/2007 | Taylor | B29C 64/20 264/308 |
| 2006/0108712 | A1 * | 5/2006 | Mattes | B33Y 30/00 264/308 |
| 2011/0310370 | A1 * | 12/2011 | Rohner | B29C 64/124 355/53 |
| 2014/0339741 | A1 * | 11/2014 | Aghababaie | B33Y 30/00 264/401 |
| 2015/0165686 | A1 * | 6/2015 | Liu | B29C 64/20 700/119 |
| 2015/0165695 | A1 * | 6/2015 | Chen | B33Y 30/00 425/132 |
| 2015/0290878 | A1 * | 10/2015 | Houben | B29C 67/0059 419/1 |

* cited by examiner

*Primary Examiner* — Robert B Davis
(74) *Attorney, Agent, or Firm* — JCIPRNET

(57) ABSTRACT

A three dimensional printing apparatus including a tank filled with liquid forming material, a platform disposed in the tank and immersed in the liquid forming material, and a curing tool disposed next to the tank is provided. The tank has at least two forming areas in step manner. The tank and the platform are controlled to generate a relative planer motion, wherein the platform moves from a forming area in higher step towards another forming area in lower step. When the platform moves to one of the forming areas, the curing tool cures the liquid forming material between the platform and the forming area to form a solidification layer on the platform. As the platform moves by at least two forming areas to form at least two solidification layers, the solidification layers are stacked to form a three dimensional object.

12 Claims, 3 Drawing Sheets

THREE DIMENSIONAL PRINTING APPARATUS

BACKGROUND

1. Field

The disclosure relates to a three dimensional printing apparatus.

2. Description of Related Art

As technology progresses, different methods of forming three dimensional (3-D) models through additive manufacturing technology have been proposed. Generally, additive manufacturing technology uses the design information of 3-D models from software such as computer-aided design (CAD) to be converted to multiple thin cross sections (quasi-two-dimensional) continuously stacked.

Presently, multiple techniques for forming a plurality of thin cross sections have already been developed. For example, a moving platform may be disposed in liquid forming material, and a light source may be driven according to the x-y-z coordinates of the design information of the 3-D model. The light source is driven along the x-y coordinates to irradiate the liquid forming material. Then the liquid forming material cures to become the correct cross sectional shape. Next, as the moving platform moves along the z-axis, the cured material that is cured layer by layer may be formed into a three dimensional object.

However, as mentioned above, the moving platform needs to be moved along the z-axis once after every layer is cured. This means that too much time is spent having the moving platform move along the z-axis. Thus, the manufacturing time is too long and inefficient.

SUMMARY

The disclosure provides a three dimensional printing apparatus having better mold forming efficiency.

The disclosure provides three dimensional printing apparatus including a tank, a platform, and a curing tool. The tank is filled with liquid forming material. The tank has at least two forming areas in step manner. The platform is disposed in the tank and immersed in the liquid forming material. The tank and the platform are adapted to generate a relative planar motion, so that the platform moves from a forming area in a higher step towards another forming area in a lower step. The curing tool is disposed next to the tank. When the platform moves to one of the forming areas, the curing tool cures the liquid foaming material between the platform and the forming area to form a solidification layer on the platform. As the platform moves by at least two forming areas to form at least two solidification layers, the solidification layers are stacked to form a three dimensional object.

Based on the above, the tank filled with the liquid forming material has at least two forming areas in step manner. The tank and the platform are adapted to generate a relative planar motion, so that the platform moves from a forming area in a higher step towards another forming area in a lower step. When the platform passes a forming area, the curing tool cures the liquid forming material between the platform and the corresponding forming area to form a solidification layer on the platform. Thus, when the platform moves to the next forming areas, curing and stacking can be performed directly on the cured solidification layer. This way, as the platform moves by the forming areas, a plurality of solidification layers may be stacked to form a three dimensional object. Since the tank and the platform are adapted to generate a relative planar motion, movement in the height direction is avoided, which effectively reduces forming time.

At the same time, because of the relative planar motion of the platform, the shear force allows the solidification layers to separate from the forming areas of the tank. This reduces the driving force required for the apparatus. Accordingly, the three dimensional printing apparatus has improved efficiency.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
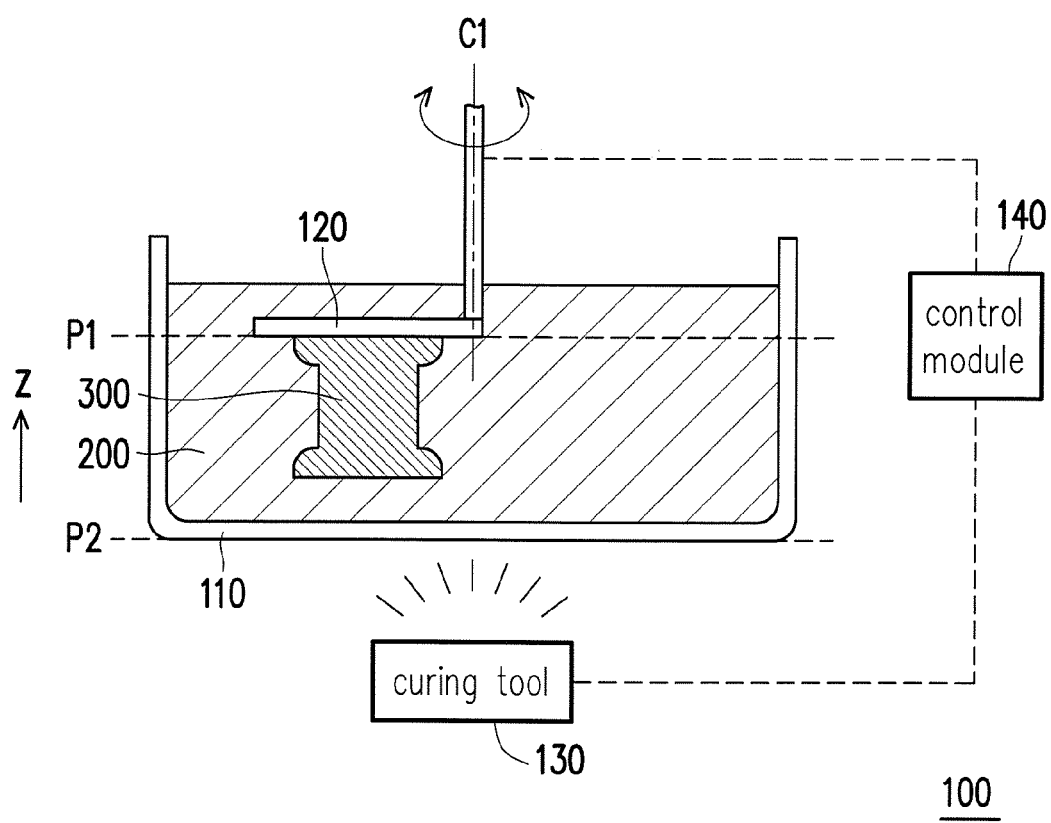
FIG. 1 is a side view of a three dimensional printing apparatus according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
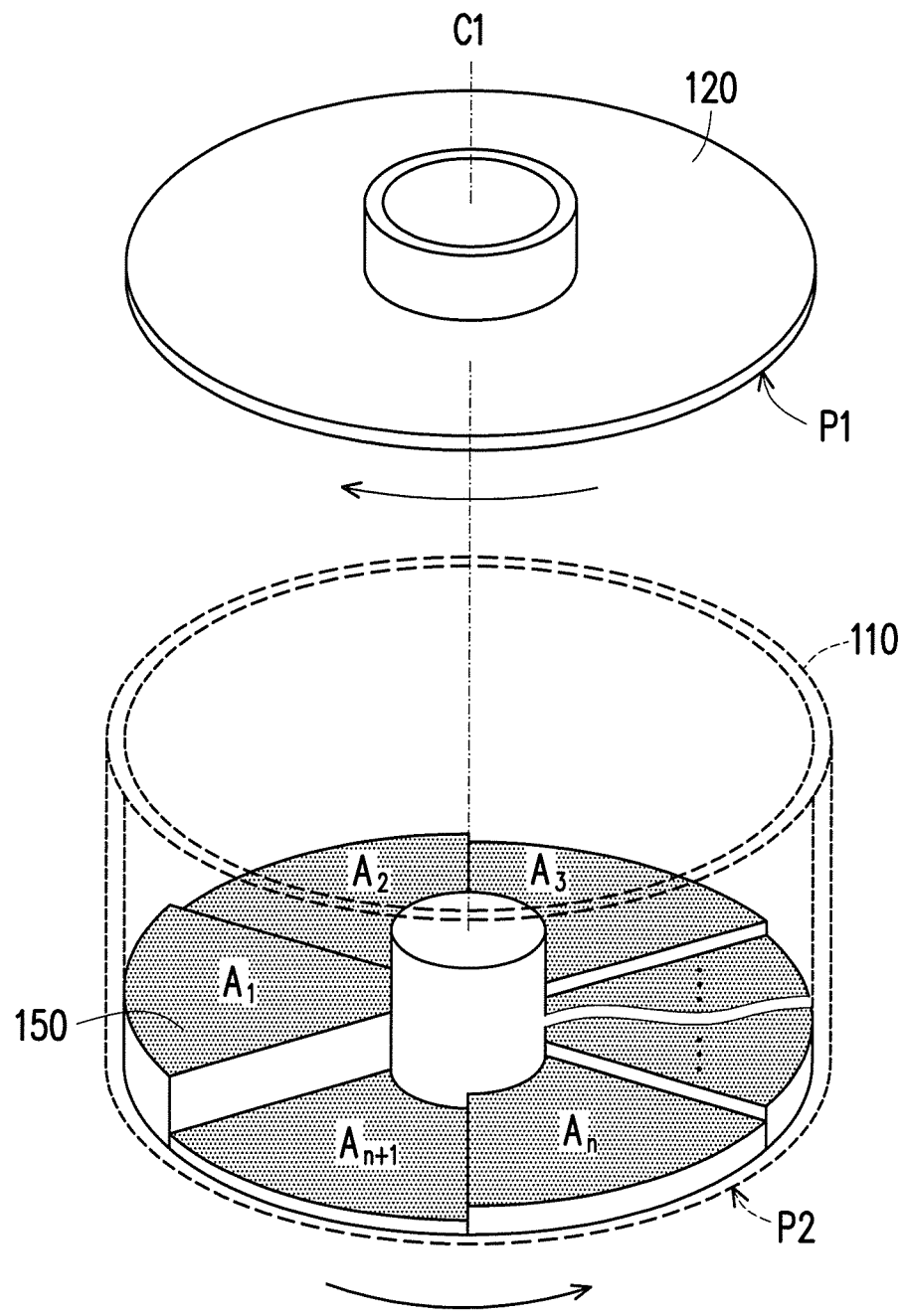
FIG. 2 is a partial schematic view of the three dimensional printing apparatus of FIG. 1.

FIG. 1 is a side view of a three dimensional printing apparatus according to an embodiment of the disclosure. FIG. 2 is a partial schematic view of the three dimensional printing apparatus of FIG. 1. Herein the partial structure is shown in dotted lines to better be identified. Referring to FIG. 1 and FIG. 2, in the embodiment, the three dimensional printing apparatus 100 includes a tank 110, a platform 120, a curing tool 130, and a control module 140. The tank 110 is adapted to be filled with a liquid forming material 200. The platform 120 is disposed in the tank 110 and immersed in the liquid forming material 200. The control module 140 is electrically connected to at least one of the platform 120 and the tank 110. The control module 140 is electrically connected to the curing tool 130.

Herein, the three dimensional printing apparatus 100 is, for example, a stereo lithography (SL) or digital light processing (DLP) apparatus. The liquid forming material 200 is, for example, photosensitive resin. The control module 140 drives the curing tool 130, such as a curing light source, so that the liquid forming material 200 may be cured and formed on the platform 120. However, the disclosure is not limited thereto. Other suitable methods and materials may still be adopted to form a three dimensional object as described above. Based on the above, the embodiment has the curing tool 130 cure and stack the liquid forming material 200 on a forming plane P1 of the platform 120 layer by layer, so as to form the three dimensional object 300.

In addition, the disclosure does not limit the amount of the curing tools 130 or the position of the curing tool 130 with respect to the tank 110. Even though the embodiment shows the curing tool 130 below the tank 110, the position may be configured according to the formation requirements. That is to say, under the premise that the curing tool 130 may effectively cure and form the liquid forming material, the curing tool 130 may be positioned anywhere near the tank 110.

In the embodiment, the tank 110 has a plurality of forming areas $A_1, \ldots A_n, A_{n+1}$ as shown in FIG. 2, wherein n is a positive integer, so as to form a group of forming areas $A=\{A_1, \ldots A_n, A_{n+1}\}$. It should be noted that the forming areas $A_1, \ldots A_n, A_{n+1}$ are not coplanar. That is to say, the forming areas $A_1, \ldots A_n, A_{n+1}$ are substantially arranged in a step manner, and have different heights with respect to the z-axis.

To be specific, using the forming plane P1 of the platform 120 as a reference, the forming plane P1 has a distance D $(A_n)$ between each corresponding forming area. In the embodiment, D $(A_n)$<D $(A_{n+1})$, to clearly show the step manner structure. In other words, if the forming area $A_1$ is the start point, as the position of the forming areas change, such moving from $A_1$ towards $A_{n+1}$, the distance D $(A_n)$ corresponding to the forming plane P1 of the platform 120 gradually increases. On the contrary, if a bottom plane P2 of the tank 110 is used as a reference, then a height of the forming areas with respect to the bottom plane P2 of the tank 110 gradually decreases as the position being changed from the forming area $A_1$ towards the forming area $A_{n+1}$.

In addition, according to the embodiment, the forming areas $A_1, \ldots A_n, A_{n+1}$ surround an axis C1 to be arranged into a closed profile. Thus, at least one of the platform 120 or the tank 110 may be controlled by the control module 140 to rotate in a planar motion relative to each other with the axis C1 as the rotation axis (the platform 120 and the tank 110 generate a relative planar rotation. As seen in FIG. 2, the platform 120 rotates clockwise and the tank 110 does not move, or the platform 120 does not move and the tank 110 rotates counter clockwise, or the platform 120 rotates clockwise and at the same time the tank 110 rotates counter clockwise). In other words, the control module 140 may drive each of the platform 120 and the tank 110 to generate relative motion with each other on a simulated plane. The simulated plane is parallel to the forming plane P1 of the platform 120 (and parallel to the bottom plane P2 of the tank 110). Herein, the z axis may be regarded as a normal of the simulated plane, the forming plane P1, and the bottom plane P2.

Figure 3:
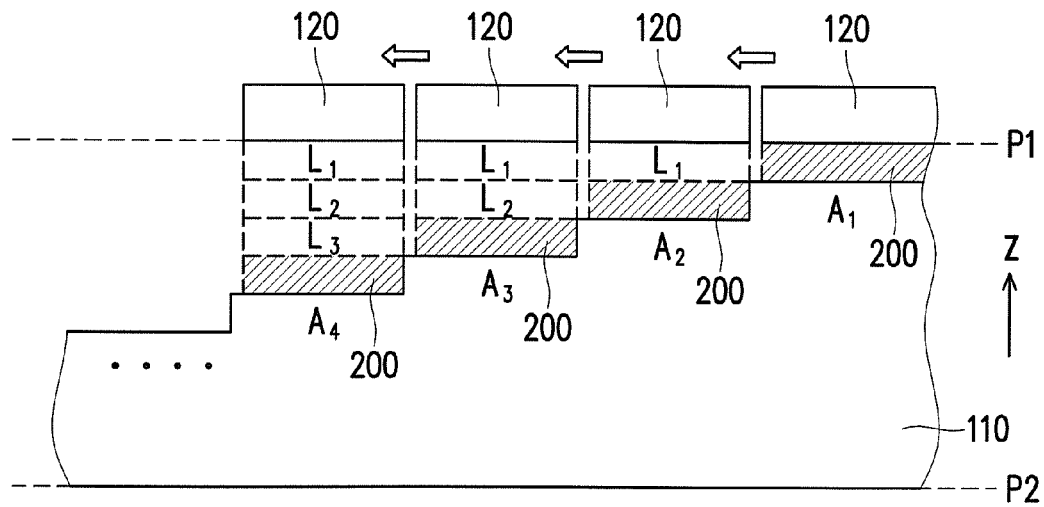
FIG. 3 is an extending schematic view of the tank of FIG. 2.

For example, FIG. 3 is an extending schematic view of the tank of FIG. 2. Herein the closed outline of the forming areas $A_1, \ldots A_n, A_{n+1}$ of FIG. 2 is stretched out and straightened to form the step structure in a straight line arrangement as shown in FIG. 3. For a simpler and clearer description of the movement of the platform 120, the forming area $A_1$ corresponding to the bottom plane P2 of the tank 110 has the greatest height. Referring to FIG. 3, when the platform 120 moves to the forming area $A_1$, the control module 140 drives the curing tool 130 to cure the liquid forming material 200 between the platform 120 and the forming area $A_1$, according to the required shape information. This way, a solidification layer $L_1$ is formed on the forming plane P1. Next, when the platform 120 rotates from the forming area $A_1$ to the forming area $A_2$, the solidification layer $L_1$ is successfully moved and separated through shear force from the forming area $A_1$. At the forming area $A_2$, the curing tool 130 further cures the liquid forming material 200 between the solidification layer $L_1$ and the forming area $A_2$ according to the required shape information. This way, a solidification layer $L_2$ is formed on the solidification layer $L_1$. Accordingly, as the platform 120 rotates by the forming areas $A_1, \ldots A_n, A_{n+1}$, the solidification layers $L_n$ are stacked layer by layer to form the three dimensional object 300. Furthermore, in the embodiment, the difference in height of adjacent forming areas (for example between the forming area $A_1$ and the forming area $A_2$) is substantially the thickness of a solidification layer $L_n$. That is, a distance between the D $(A_{n+1})$ and the D $(A_n)$ is the thickness of the solidification layer $L_n$. Thus, relative planar motion of the embodiment may achieve the same effects of the conventional method of movement along the z axis. Therefore, the movement of the platform 120 or the tank 110 along the z axis may be avoided so as to not waste fabrication time. In an embodiment not shown, in the curing effect of the curing tool 130 corresponding to the liquid forming material 200, the difference between the D $(A_{n+1})$ and the D $(A_n)$ is greater than the thickness of the solidification layer $L_n$.

For example, the platform 120 could rotate from forming area $A_1$ to $A_3$ and to $A_5$ by passing the forming area $A_2$ and $A_4$ with the solidification layers $L_2$ and $L_3$ being cured in a one-time curing. On the other hand, referring to FIG. 2, the tank 110 further includes a plurality of coating layers 150 (as shown in dot pattern), respectively disposed on the forming areas $A_1, \ldots A_n, A_{n+1}$. The coating layers 150 are, for example, polytetrafluoroethene (PTFE) or polydimethylsiloxane (PDMS). The coating layers 150 are for reducing the viscosity between the liquid forming material 200 and the tank 110. This way, the formed solidification layer $L_n$ may be successfully separated from the forming layers $A_1, \ldots A_n, A_{n+1}$.

Based on the above, compared to the moving of the platform or tank along the z axis, the embodiment not only achieves the effect of reduced fabrication time. The embodiment also replaces the conventional technique that requires a positive force applied along the z axis so that the solidification layers may be separated from the tank with a more effective method. That is, through the relative planar motion between the platform 120 and the tank 110, each of the solidification layers $L_n$ may be separated from the forming areas $A_1, \ldots A_n, A_{n+1}$ of the tank 110 through a shear force (the applied force is perpendicular to the z axis), wherein the shear force is less than a required normal force applied along the z axis. Thus, the solidification layers $L_n$ may be more effectively separated from the forming areas $A_1, \ldots A_n, A_{n+1}$ of the tank 110.

It should be noted that even though the embodiment has a group of forming areas $A=\{A_1, \ldots A_n, A_{n+1}\}$, during the forming process, the embodiment does not limit the platform 120 to have to pass through all the forming areas one by one. That is, in an embodiment not shown, the user only needs to select at least two of the forming areas $A_1, \ldots A_n, A_{n+1}$. However, the trend and requirement of the movement of the platform 120 rotating from a forming area in a higher step (such as the forming area $A_1$) towards a forming area in a lower step (such as the forming area $A_{n+1}$) does not change.

Figure 4:
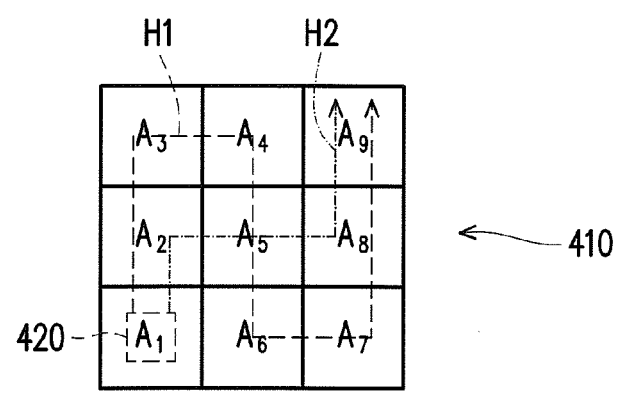
FIG. 4 is a schematic top view of a platform and a tank of a three dimensional printing apparatus according to another embodiment of the disclosure.

In addition, the disclosure does not limit the shape of the forming areas in the tank, the shape of the platform, and the mode of relative motion between the platform and the tank. FIG. 4 is a schematic top view of a platform and a tank of a three dimensional printing apparatus according to another embodiment of the disclosure. The difference between the embodiment of FIG. 4 and the previous embedment is the configuration of the forming areas (for example the forming areas from $A_1$ to $A_9$, but not limited thereto) are arranged in an array. The similarity between the embodiment of FIG. 4 and the previous embedment is the height of the forming areas relative to the bottom of the tank 410 gradually decreases from the forming area $A_1$ to the forming area $A_9$.

Thus, the platform 420 may move from the path H1 from the forming area $A_1$ to the forming area $A_9$.

Furthermore, the platform 420 of the embodiment only occupies a portion of the area of the forming areas $A_1$ to $A_9$, unlike the platform 120 of the previous embodiment that has the same area as the forming areas $A_1, \ldots A_n, A_{n+1}$. However, this does not affect the formation of the solidification layers on the platform 420. In addition, similar to the previous embodiment, the embodiment does not limit the relative motion and path of the platform 420 and the tank 410. That is, as long as the platform 420 moves from a forming area in a higher step towards another forming area in a lower step, the platform 420 may also move along the path H2.

To sum up, in the embodiment, the bottom of the tank has at least two forming areas in step manner. The tank and the platforms are adapted to generate a relative planar motion, so that the platform moves from a forming area in a higher step towards another forming area in a lower step. When the platform passes a forming area, the curing tool cures the liquid forming material to generate a solidification layer on the platform. Thus, when the platform moves by at least two forming areas, solidification layers may be cured and stacked to form a three dimensional object. By having the tank in a step manner, movement of the platform or the tank in the height direction is avoided, which effectively reduces forming time. At the same time, after the solidification layer is formed in the forming area, because of the relative planar motion between the platform and the tank, the solidification layer may be separated by the shear force between the platform and the tank. Compared to conventional technique of requiring a normal force applied in the height direction for separation, the disclosure saves energy and effort. Accordingly, through the above configuration, the three dimensional printing apparatus has improved forming efficiency.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A three dimensional printing apparatus, comprising:
    a tank, filled with a liquid forming material, wherein the tank has at least two forming areas in step manner;
    a platform, disposed in the tank and immersed in the liquid forming material, wherein the tank and the platform are adapted to generate a relative planar motion, so that the platform moves from a forming area in a higher step towards another forming area in a lower step; and
    a curing tool, disposed adjacent to the tank, wherein when the platform moves to each of the forming areas, the curing tool cures the liquid forming material between the platform and the corresponding forming area to form a solidification layer on the platform, and as the platforms moves by at least two forming areas to form at least two solidification layers, the solidification layers are stacked to form a three dimensional object.

2. The three dimensional printing apparatus as claimed in claim 1, wherein the at least two forming areas comprises a plurality of forming areas forming a group $A=\{A_1, \ldots A_n, A_{n+1}\}$, wherein n is a positive integer, and as the platforms moves by the forming area $A_n$, the curing tool cures the liquid forming material between the platform and the forming area $A_n$ to form a solidification layer $L_n$.

3. The three dimensional printing apparatus as claimed in claim 2, wherein the platform sequentially passes by at least two forming areas of the group $A=\{A_1, \ldots A_n, A_{n+1}\}$, so that at least two solidification layers are stacked to form the three dimensional object.

4. The three dimensional printing apparatus as claimed in claim 2, wherein a distance D $(A_n)$ is between the platform and each of the forming areas, and D $(A_n)$<D $(A_{n+1})$.

5. The three dimensional printing apparatus as claimed in claim 4, wherein a difference between the D $(A_{n+1})$ and the D $(A_n)$ is greater than or equal to a thickness of the solidification layer.

6. The three dimensional apparatus as claimed in claim 2, wherein the forming areas are arranged to form a closed profile.

7. The three dimensional printing apparatus as claimed in claim 2, wherein the forming areas are arranged to form an array.

8. The three dimensional printing apparatus as claimed in claim 1, further comprising:
    a control module, electrically connected to at least one of the platform and the tank, so as to drive the platform and the tank to generate the relative planar motion, and the control module is electrically connected to the curing tool.

9. The three dimensional printing apparatus as claimed in claim 1, wherein the platform comprises a forming plane, the three dimensional object is formed on the forming plane, and the relative planar motion generated between the platform and the tank is parallel to the forming plane.

10. The three dimensional printing apparatus as claimed in claim 1, wherein the three dimensional printing apparatus is a stereo lithography or digital light processing apparatus.

11. The three dimensional printing apparatus as claimed in claim 1, wherein the tank further comprises a plurality of coating layers, respectively disposed on the at least two forming areas.

12. The three dimensional printing apparatus as claimed in claim 11, wherein the coating layers are polytetrafluoroethene or polydimethylsiloxane.

* * * * *